US009654815B2

(12) United States Patent
Czeck, Jr. et al.

(10) Patent No.: US 9,654,815 B2
(45) Date of Patent: May 16, 2017

(54) ADVERTISING DETECTION IN ADAPTIVE BITRATE STREAMING

(71) Applicant: ARRIS Enterprises, Inc., Suwanee, GA (US)

(72) Inventors: David J. Czeck, Jr., Beaverton, OR (US); Steven Eric Omner, West Linn, OR (US); Senthilprabu Vadhugapalayam Shanmugam, Bengaluru (IN); Shailesh Ramamurthy, Bengaluru (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/858,507

(22) Filed: Sep. 18, 2015

(65) Prior Publication Data

US 2017/0085933 A1    Mar. 23, 2017

(51) Int. Cl.
*H04N 7/10* (2006.01)
*H04N 7/025* (2006.01)
(Continued)

(52) U.S. Cl.
CPC ... *H04N 21/2668* (2013.01); *H04N 21/23418* (2013.01); *H04N 21/26258* (2013.01);
(Continued)

(58) Field of Classification Search
CPC .......... H04N 21/812; H04N 21/23418; H04N 21/26258; H04N 21/2668; H04N 21/44008; H04N 21/6587
See application file for complete search history.

(56) References Cited

U.S. PATENT DOCUMENTS

2009/0007195 A1* 1/2009 Beyabani ............... H04N 7/163
  725/86
2009/0327844 A1* 12/2009 Suneya ................. H04L 1/0009
  714/776

(Continued)

OTHER PUBLICATIONS

"How do you prevent the user from seeking over adverts introduced in HLS using the EXT-XDISCONTINUITY tag?" StackOverflow.com; http://stackoverflow.com/questions/9507237/how-do-you-prevent-the-user-from-seeking-over-adverts-introduced-in-hls-using-th, Mar. 2012.

*Primary Examiner* — Joshua Taylor
(74) *Attorney, Agent, or Firm* — Thomas A. Ward

(57) ABSTRACT

A method of handling advertisements in an adaptive bitrate stream is provided. The method includes the steps of receiving an adaptive bitrate stream playlist listing chunk identifiers pointing to a plurality of media chunks, analyzing the playlist to find one or more advertising chunks, modifying the adaptive bitrate stream playlist with a client device when the client device has been set to skip advertisements by deleting chunk identifiers associated with advertising chunks from the playlist, retrieving and playing back media chunks according to the playlist, and setting a no-trick-play flag at the client device during playback of the one or more advertising chunks when the client device has not been set to skip advertisements, such that trick-plays through and over media chunks are allowed when the no-trick-play flag is not set and are not allowed when the no-trick-play flag is set.

7 Claims, 12 Drawing Sheets

(51) Int. Cl.
 H04N 21/2668 (2011.01)
 H04N 21/81 (2011.01)
 H04N 21/6587 (2011.01)
 H04N 21/44 (2011.01)
 H04N 21/234 (2011.01)
 H04N 21/262 (2011.01)
(52) U.S. Cl.
 CPC ... H04N 21/44008 (2013.01); H04N 21/6587 (2013.01); H04N 21/812 (2013.01)

(56) References Cited

U.S. PATENT DOCUMENTS

2011/0211812 A1\* 9/2011 Tzoukermann .... H04N 7/17318
 386/250
2011/0246661 A1\* 10/2011 Manzari ................. G06Q 30/02
 709/231

\* cited by examiner

| Content Chunk 202 | Content Chunk 202 | Content Chunk 202 | Content Chunk 202 | Ad Chunk 302 | Ad Chunk 302 | Content Chunk 202 | Content Chunk 202 |
|---|---|---|---|---|---|---|---|
| No-Trick-Play Flag 1200 OFF |||| No-Trick-Play Flag 1200 ON || No-Trick-Play Flag 1200 OFF ||

US 9,654,815 B2

ADVERTISING DETECTION IN ADAPTIVE BITRATE STREAMING

TECHNICAL FIELD

The present disclosure relates to the field of digital video streaming, particularly regarding the detection of advertisements inserted into adaptive bitrate streams.

BACKGROUND

Streaming live or prerecorded media content to client devices such as set-top boxes, computers, smartphones, mobile devices, tablet computers, gaming consoles, and other devices over networks such as the internet has become increasingly popular. Delivery of such media content commonly relies on adaptive bitrate streaming technologies such as HTTP Live Streaming (HLS), Smooth Streaming, and MPEG-DASH.

A stream of media content encoded with adaptive bitrate streaming techniques is generally divided into multiple chunks, each of which can be independently accessible. A client device can play a media stream by requesting and decoding a first chunk, requesting and decoding a second chunk, and continuing to request and decode subsequent chunks for as long as the user of the client device desires to play the media content, or until playback reaches the end of the media content.

The division of an adaptive bitrate stream into multiple chunks also allows a client device to jump to specific chunks of the stream when desired. For instance, a client device can request a particular chunk located halfway through a stream to begin playback of the stream at the halfway point of the media content, or it can jump between different points in the media content by requesting chunks located at associated positions in the stream. Additionally, segmentation of the streams can allow the client device to transition between different versions of a stream that have each been encoded at different quality levels. For instance, when network conditions are congested, a client device can begin playback of a media stream by requesting chunks encoded with a low bitrate, but when network conditions improve the client device can transition to a higher quality version of the stream by requesting subsequent chunks encoded at a higher bitrate.

The segmentation of a media stream also allows chunks of advertising content to be inserted into the stream between chunks of main content. While some streaming video solutions switch to a different video player or begin an entirely separate video stream to display an advertisement, which can take time, the segmentation of an adaptive bitrate stream allows advertisements to be inserted as additional chunks between existing chunks of the main media stream, such that an advertisement is played just as if it were the next chunk of the main media stream without having to change video players or load a new stream.

Entities such as content providers, network operators, and set-top box vendors often benefit financially by displaying or allowing advertisements to be inserted into media streams. However, viewers often prefer to skip or fast-forward through such advertisements. What is needed is a method for detecting, with a client device, when advertisements have been inserted into a media stream and then either preventing the client device from skipping the advertisements or having the client device automatically skip the advertisements.

SUMMARY

What is needed is a method for identifying advertising chunks inserted into a media stream. Identification of such inserted advertising chunks can be used by a client device to block trick-plays over or through the advertising content, or to automatically skip over the advertising content.

In one embodiment the present disclosure provides for a method of handling advertisements in an adaptive bitrate stream, the method comprising receiving at a client device an adaptive bitrate stream playlist listing chunk identifiers pointing to a plurality of media chunks, analyzing the adaptive bitrate stream playlist with the client device to find one or more advertising chunks within the plurality of media chunks, modifying the adaptive bitrate stream playlist with the client device when the client device has been set to skip advertisements by deleting chunk identifiers associated with advertising chunks from the adaptive bitrate stream playlist, retrieving and playing back at least one of the plurality of media chunks with the client device according to the adaptive bitrate stream playlist, and setting a no-trick-play flag at the client device during playback of the one or more advertising chunks when the client device has not been set to skip advertisements, such that trick-plays through and over media chunks are allowed when the no-trick-play flag is not set and are not allowed when the no-trick-play flag is set.

In another embodiment the present disclosure provides for a method of preventing skipping advertisements in an adaptive bitrate stream, the method comprising receiving at a client device an adaptive bitrate stream playlist listing chunk identifiers pointing to a plurality of media chunks, analyzing the adaptive bitrate stream playlist with the client device to find one or more advertising chunks within the plurality of media chunks, retrieving and playing back at least one of the plurality of media chunks with the client device according to the adaptive bitrate stream playlist, setting a no-trick-play flag at the client device during playback of the one or more advertising chunks, allowing trick-plays through and over media chunks when the no-trick-play flag is not set, and disallowing trick-plays through and over at least one media chunk when the no-trick-play flag is set.

In another embodiment the present disclosure provides for a method of skipping advertisements in an adaptive bitrate stream, the method comprising receiving at a client device an adaptive bitrate stream playlist listing chunk identifiers pointing to a plurality of media chunks, analyzing the adaptive bitrate stream playlist with the client device to find one or more advertising chunks within the plurality of media chunks, generating a modified adaptive bitrate stream playlist with the client device by deleting chunk identifiers associated with the one or more advertising chunks from the adaptive bitrate stream playlist, and retrieving and playing back at least one of the plurality of media chunks with the client device according to the modified adaptive bitrate stream playlist.

BRIEF DESCRIPTION OF THE DRAWINGS

Further details of the present invention are explained with the help of the attached drawings in which.

DETAILED DESCRIPTION

Figures 1, 2, 3:
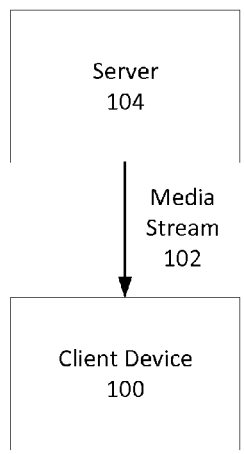
FIG. 1 depicts a client device receiving a media stream from a server over a network.
FIG. 2 depicts an exemplary embodiment of a portion of a media stream.
FIG. 3 depicts an example of advertising chunks inserted between otherwise adjacent content chunks of a media stream.

FIG. 1 depicts a client device 100 receiving a media stream 102 from a server 104 over a network. The client device 100 can be a set-top box, cable box, computer, smartphone, mobile device, tablet computer, gaming console, or any other device configured to request, receive, and play back media streams 102. The client device 100 can have one or more processors, data storage systems or memory, and/or communication links or interfaces. The media stream 102 can be an adaptive bitrate stream, such as an HTTP Live Streaming (HLS) stream, a Smooth Streaming stream, an MPEG-DASH stream, or any other type of adaptive bitrate stream. The server 104 can be a server or other network element that stores, processes, and/or delivers media streams 102 to client devices 100 over a network such as the internet or any other data network. By way of non-limiting examples, the server 104 can be an Internet Protocol television (IPTV) server, over-the-top (OTT) server, or any other type of server or network element. The server 104 can have one or more processors, data storage systems or memory, and/or communication links or interfaces. In some embodiments, HTTP (Hypertext Transfer Protocol) can be used as a content delivery mechanism to transport the media stream 102 from a server 104 to a client device 100. In other embodiments, other transport mechanisms or protocols such as RTP (Real-time Transport Protocol) or RTSP (Real Time Streaming Protocol) can be used to deliver media streams 102 from servers 104 to client devices 100.

FIG. 2 depicts an exemplary embodiment of a portion of a media stream 102. A media stream 102 can be a digitally encoded version of a piece of media content, such as a movie, television show, or any other video. The media content can be encoded into a media stream 102 using a video coding format and/or compression scheme such as H.264, MPEG-2, HEVC, or any other format. As shown in FIG. 2, a media stream 102 can be segmented into a series of content chunks 202. Each content chunk 202 can be a digitally encoded segment of a larger piece of media content. By way of a non-limiting example, each content chunk 202 can be relatively short portion of the media content, such as a 5 to 30 second segment of a video. Each content chunk 202 can be independently decodable by client devices 100, and can be made available to client devices 100 independently as described below.

FIG. 3 depicts a non-limiting example of advertising chunks 302 inserted between otherwise adjacent content chunks 202 of a media stream 102. An advertising chunk 302 can be a digitally encoded segment or full piece of advertising or promotional content. As such, advertising chunks 302 can be content chunks 202 devoted to advertising or promotional content instead of main media content, and can thus be treated by client devices 100 as if they were any other content chunk 202 in a media stream 102.

Figure 4A:
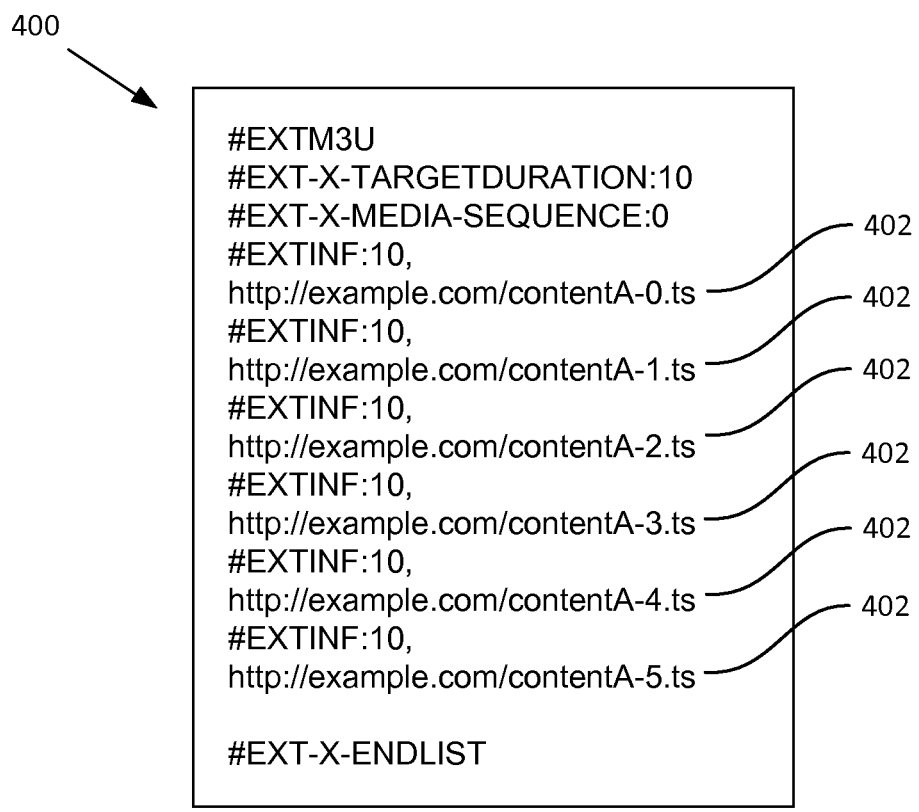
FIG. 4A depicts an exemplary playlist that includes chunk identifiers associated with a media stream.
Figure 4B:
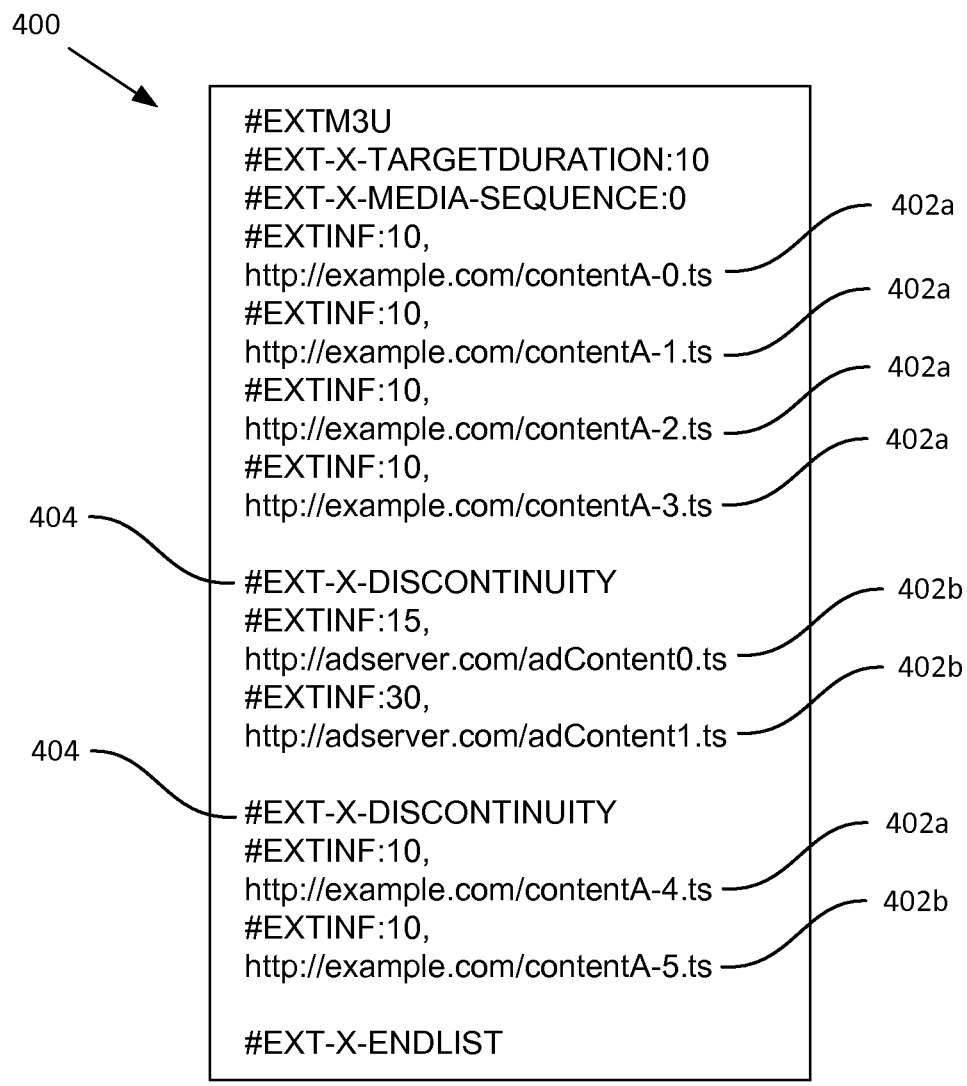
FIG. 4B depicts an alternate version of the playlist shown in FIG. 4A that includes chunk identifiers associated with advertising content interspersed between chunk identifiers associated with the media stream.

FIGS. 4A and 4B depict exemplary embodiments of playlists 400. A playlist 400 can be a manifest that describes information about a media stream 102, content chunks 202, and/or advertising chunks 302. A playlist 400 can comprise a series of chunk identifiers 402. Each chunk identifier 402 can describe information about a particular content chunk 202 or advertising chunk 302, such as its location, identity, and/or duration. By way of a non-limiting example, each chunk identifier 402 can include a URL and/or filename describing the identity and location of an associated content chunk 202 or advertising chunk 302. In some embodiments, chunk identifiers 402 can also include a duration tag indicating the length of the associated content chunk 202 or advertising chunk 302. By way of a non-limiting example, a chunk identifier 402 can include an #EXTINF tag that indicates the associated chunk's duration in seconds.

A playlist 400 can be made available to client devices 100 such that a client device 100 can access the content chunks 202 and/or advertising chunks 302 described in the playlist 400. As the content chunks 202 and/or advertising chunks 302 can be listed individually within the playlist 400 and can be individually accessible and decodable, a client device 100 can access the content chunks 202 and/or advertising chunks 302 described by the chunk identifiers 402 either following the order in which the chunk identifiers 402 are listed in the playlist 400 or by jumping to specific chunks out of order.

When more than one variant of a particular media stream 102 is available to client devices 100, such as when the same media content has been encoded multiple times with different bitrates, a master playlist can be provided that includes links to a playlist 400 for each individual variant of the media stream 102. A client device 100 can use the master playlist to access the chunk identifiers 402 within the playlists 400 for each variant. The client device 100 can thereby have access to different versions of each content chunk 202, such that the client device 100 can select the version of each successive content chunk 202 that is appropriate for current network conditions or other factors.

FIG. 4A depicts an exemplary playlist 400 that includes chunk identifiers 402 associated with a media stream 102, while FIG. 4B depicts an alternate version of the playlist 400 that includes chunk identifiers 402 associated with advertising content interspersed between chunk identifiers 402 associated with the media stream 102. In some embodiments or situations, chunk identifiers 402 can identify advertising chunks 302 located at a different location than content chunks 202 of the main media stream 102, such as at a different server or directory. In other embodiments or situations, chunk identifiers 402 can indicate that advertising chunks 302 are located in the same directory as the content chunks 202.

In some playlists 400, a discontinuity tag 404 can be placed in a playlist 400 in front of and/or after chunk identifiers 402 associated with advertising content, to assist in distinguishing chunk identifiers 402 associated with advertising from those associated with the main media content. By way of a non-limiting example, an #EXT-X-DISCONTINUITY tag can be inserted between chunk identifiers 402 in a playlist 400 that are associated with content chunks 202 and advertising chunks 500. In other playlists 400, discontinuity tags 404 can be absent.

Returning to the example shown in FIG. 3, a client device 100 can follow a sequence of chunk identifiers 402 in a playlist 400 to transition from accessing a series of content chunks 202 from a media stream 102, to accessing advertising chunks 302, and then return back to accessing additional content chunks 202 from the media stream 102. Although the content chunks 202 of a media stream 102 can be arranged in an ordered series, any outside advertising chunks 302 linked to within a playlist 400 can be accessed between adjoining content chunks 202 of the media stream 102 without re-encoding or modifying the media stream 102 itself.

By way of a non-limiting example, a client device 100 can follow the playlist 400 of FIG. 4B to access the first four content chunks 202 of a media stream 102 using the first four chunk identifiers 402a, access two advertising chunks 302 using the two chunk identifiers 402b positioned between the discontinuity tags 404, and then access the two remaining content chunks 202 of the media stream 102 using the final two chunk identifiers 402a. Because the client device 100 can treat the decoding and playback of advertising chunks 302 similarly or identically to decoding and playback of content chunks 202, advertising or promotional content can be displayed without switching to a different video player at the client device 100 or loading a separate playlist 400 for an entirely different media stream 102. Viewers of a piece of main media content can thus be diverted to advertising or promotional content and then be returned to the point in the main media content at which they were diverted.

The nature of playlists 400 that intersperse chunk identifiers 402 associated with advertising chunks 302 between chunk identifiers 402 associated with content chunks 202 can allow a client device 100 to determine when it is likely that advertising or promotional content has been inserted into a media stream 102, and to identify which chunk identifiers 402 are likely associated with advertising chunks 302.

Figure 5:
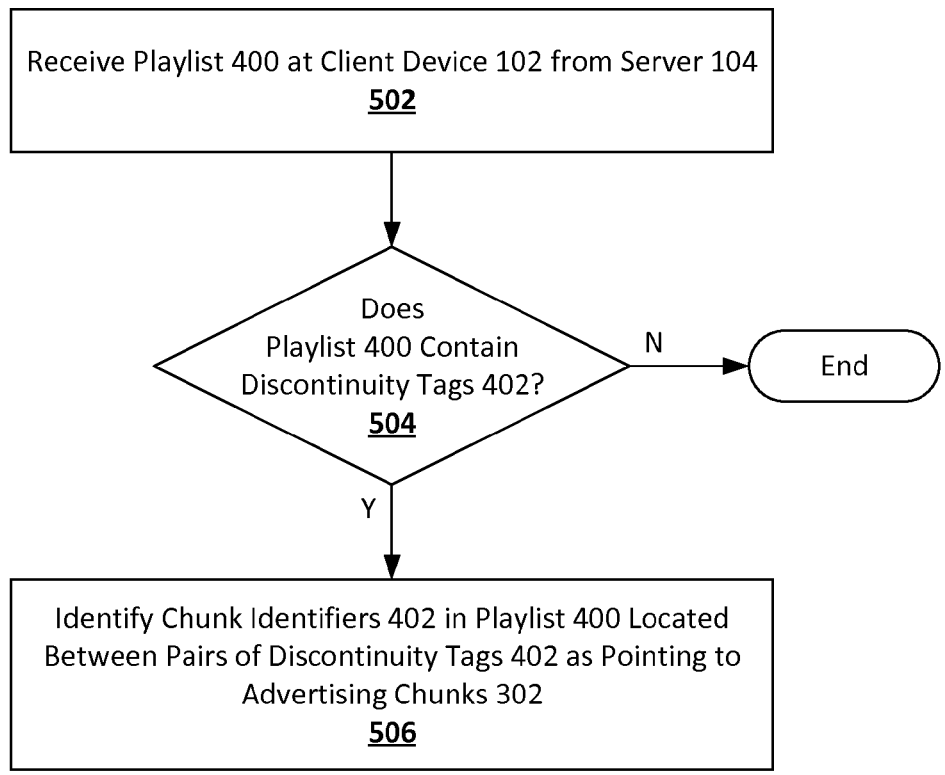
FIG. 5 depicts a first method for detecting when a playlist includes chunk identifiers likely associated with advertising chunks.

FIG. 5 depicts a first method for detecting when a playlist 400 includes chunk identifiers 402 likely associated with advertising chunks 302. At step 502, a client device 100 can receive a playlist 400 from a server 104. At step 504, the client device 100 can review the playlist 400 and determine whether or not the playlist 400 contains any discontinuity tags 404. If the playlist 400 does not contain any discontinuity tags 404, the client device 100 can determine that it is likely that none of the playlist's chunk identifiers 402 are associated with advertising chunks 302, and the process can end. However, if the playlist 400 does contain discontinuity tags 404, the client device 100 can determine that it is likely that the playlist 400 does contain chunk identifiers 402 associated with advertising chunks 302, and the client device 100 can move to step 506.

At step 506, if the client device 100 finds discontinuity tags 404 in the playlist 400, the client device 100 can identify one or more chunk identifiers 402 listed in the playlist 400 as pointing to advertising chunks 302. As each discontinuity tag 404 can signal the beginning or end of advertising or promotional content, the client device 100 can determine which chunk identifiers 402 are likely to point to advertising chunks 302 by identifying one or more chunk identifiers 402 that are surrounded by discontinuity tags 404. By way of a non-limiting example, the client device 100 can traverse the playlist 400 until an "opening" discontinuity tag 404 is found, treat subsequent chunk identifiers 402 as pointing to advertising chunks 302 until a "closing" discontinuity tag 404 is found, and then treat subsequent chunk identifiers 402 as pointing to content chunks 202 until another "opening" discontinuity tag 404 is found.

In some embodiments, the client device 100 can be set to treat chunk identifiers 402 prior to the first discontinuity tag 404 as pointing to content chunks 202, then switch between treating subsequent chunk identifiers 402 as pointing to content chunks 202 and advertising chunks 302 every time a discontinuity tag 404 is encountered. In other embodiments, the client device 100 can be set to treat chunk identifiers 402 prior to the first discontinuity tag 404 as pointing to advertising chunks 302, then switch between treating subsequent chunks as pointing to content chunks 202 and advertising chunks 302 every time a discontinuity tag 404 is encountered. In still other embodiments, chunk identifiers 402 prior to the first discontinuity tag 404 can be identified by the client device 100 as pointing to content chunks 202 or advertising chunks 302 through other methods, such as one or more of the methods described below. After identification of the initial series of chunk identifiers 402 as pointing to either content chunks 202 or advertising chunks 302 through another method, the client device 100 can traverse the playlist 400 and switch between treating subsequent chunk identifiers 402 as pointing to content chunks 202 and advertising chunks 302 every time a discontinuity tag 404 is encountered.

Figure 6:
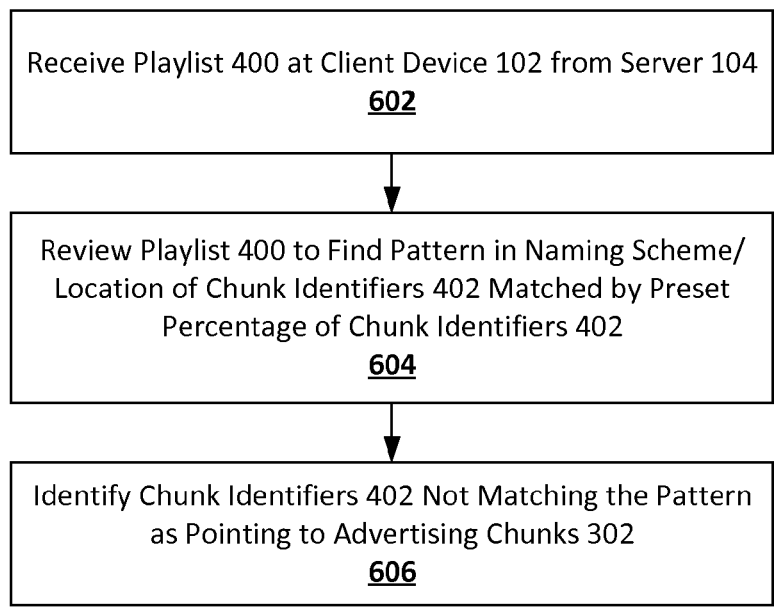
FIG. 6 depicts a second method for detecting when a playlist includes chunk identifiers likely associated with advertising chunks.

FIG. 6 depicts a second method for detecting when a playlist 400 includes chunk identifiers 402 likely associated with advertising chunks 302. At step 602, a client device 100 can receive a playlist 400 from a server 104.

At step 604, the client device 100 can review the playlist 400 and find a pattern that distinguishes chunk identifiers 402 that point to content chunks 202 from chunk identifiers 402 that point to advertising chunks 302, such as a pattern in the server names, URLs, directories, and/or file naming conventions used by the chunk identifiers 402. By way of a non-limiting example, because a broadcast generally has relatively long segments of a main piece of media content interspersed with shorter commercial breaks, the chunk identifiers 402 in a playlist 400 generally point to more content chunks 202 than advertisement chunks 302. As such, in some embodiments the client device 100 can find a pattern followed by at least a preset percentage of the chunk identifiers 402, such as finding a pattern in the server names, URLs, directories, and/or file naming conventions shared by at least 50% of the chunk identifiers 402. As that pattern was followed by the majority of the chunk identifiers 402, the client device 100 can use that pattern to identify content chunks 202.

In some embodiments or situations, the client device 100 can additionally or alternately look for patterns followed by groups of chunk identifiers 402 within a playlist 400, and compare the total duration of each group and/or the number of chunks within each group that follows the same pattern. By way of a non-limiting example, advertising chunks 302 can be inserted into a media stream 102 in small groups, such as groups of 3, 6, 9, or 12 advertising chunks 302, to insert a commercial break with a total duration of 30 or 60 seconds. However, larger groups of content chunks 202 can be positioned between such commercial breaks that together have longer durations than the commercial breaks, such as a group of 48 content chunks that together have a total duration of 8 minutes. The client device 100 can determine that larger and/or longer groups of chunk identifiers 402 with a common pattern likely point to content chunks 202, while smaller and/or shorter groups with either a common pattern or no common pattern likely point to advertisement chunks 302, and can use the pattern shared by the larger and/or longer groups as a pattern identifying content chunks 202.

In some embodiments or situations, the client device 100 can alternately or additionally accept input from viewers to indicate whether main content or an advertisement is currently being shown on the screen. By way of a non-limiting example, a user watching a media stream 102 can click a button to indicate that an advertisement is currently being shown. When such user input is received, the client device 100 can examine the chunk identifier 402 that pointed to the currently displayed chunk, and attempt to find a pattern it shares with one or more other chunk identifiers in the playlist 400. If such a pattern is found, it can be used to identify other chunk identifiers 402 that point to the same type of content.

In some embodiments, identified patterns can be cached at the client device 100 for future reference, such that the client device 100 can compare the chunk identifiers 402 in a current playlist 400 against one or more previously identified patterns to find a pattern that identifies content chunks 202 or advertising chunks. As the cache of identified patterns grows over time, a client device 100 can be trained to look for a large number of patterns. In some embodiments, the client device 100 can compare a current playlist 400 against one or more cached patterns alternately or in addition to analyzing the current playlist 400 for a new pattern. In some embodiments, cached patterns can be those identified in the past by a particular client device 100. In other embodiments a client device 100 can access or download a database of patterns identified by other client devices 100 and/or users.

At step 606, the client device 100 can identify each chunk identifier 402 as either being associated with a content chunk 202 or advertising chunk 302 based on whether or not it fits a pattern identified during step 604. By way of a non-limiting example, content chunks 202 that are encoded portions of the same media content are likely to be located at the same server and be within the same file directory, with similar filenames often differing only in a number to indicate its position in a series of chunks. As such, when most chunk identifiers 402 in a playlist 400 follow a pattern with respect to their server name, URLs, directories, file naming structure, or any other pattern, but a smaller number of chunk identifiers 402 are located at different servers, URLs, or directories, and/or have different file name structures, the client device 100 can identify ones that do not follow the pattern as pointing to advertising chunks 302 instead of content chunks 202.

Figure 7:
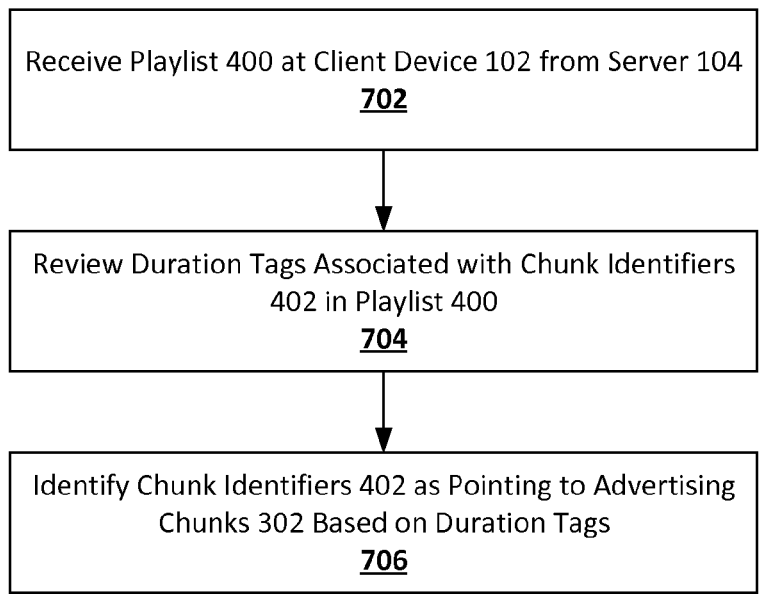
FIG. 7 depicts a third method for detecting when a playlist includes chunk identifiers likely associated with advertising chunks.

FIG. 7 depicts a third method for detecting when a playlist 400 includes chunk identifiers 402 likely associated with advertising chunks 302. At step 702, a client device 100 can receive a playlist 400 from a server 104. At step 704, the client device 100 can review the playlist 400 and examine duration tags associated with each chunk identifier 402. At step 706, the client determine that one or more chunk identifiers 402 point to advertising chunks 302 based on their duration tags.

In some embodiments, the client device 100 can search for chunk identifiers 402 with duration tags indicating that its associated chunk has a duration normally associated with advertising or promotional content. By way of a non-limiting example, the client device 100 can identify chunk identifiers 402 with #EXTINF tags of 15 seconds, 30 seconds, 45 seconds, 60 seconds, 90 seconds, or any other duration commonly associated with advertising or promotional content as pointing to advertising chunks 302.

In other embodiments, the client device 100 can compare the duration tags associated with each chunk identifier 402 and find one or more outliers. By way of a non-limiting example, if a client device 100 determines that over 50% of the chunk identifiers 402 have an #EXTINF tags of 10 seconds, and a minority have #EXTINF tags of other durations, the client device 100 can treat the minority as pointing to advertising chunks 302.

In still other embodiments, the client device 100 can treat chunk identifiers 402 with duration tags shorter than the majority of chunk identifiers 402 as indicating a break point between content chunks 202 and advertising chunks 302. In some embodiments or situations, chunks with shorter than expected durations can indicate starting points or endpoints of media content and by extension indicate where advertising or promotional content begins or ends. By way of a non-limiting example, when media content has been encoded in chunks of 10 seconds but the media content fades to black for advertising content at a time stamp located between multiples of 10 seconds, the content chunk 202 including the fade to black can be shorter than most others and can have a shorter duration tag. The client device 100 can treat the shorter duration tag as an indication that chunk identifiers 402 pointing to adverting chunks 302 occur after the chunk identifier 402 with the shorter duration tag, and can accordingly treat subsequent chunk identifiers 402 as pointing to advertising chunks 302 until it determines through this or another method that the playlist 400 has returned to listing chunk identifiers 402 pointing to content chunks 202.

Figure 8:
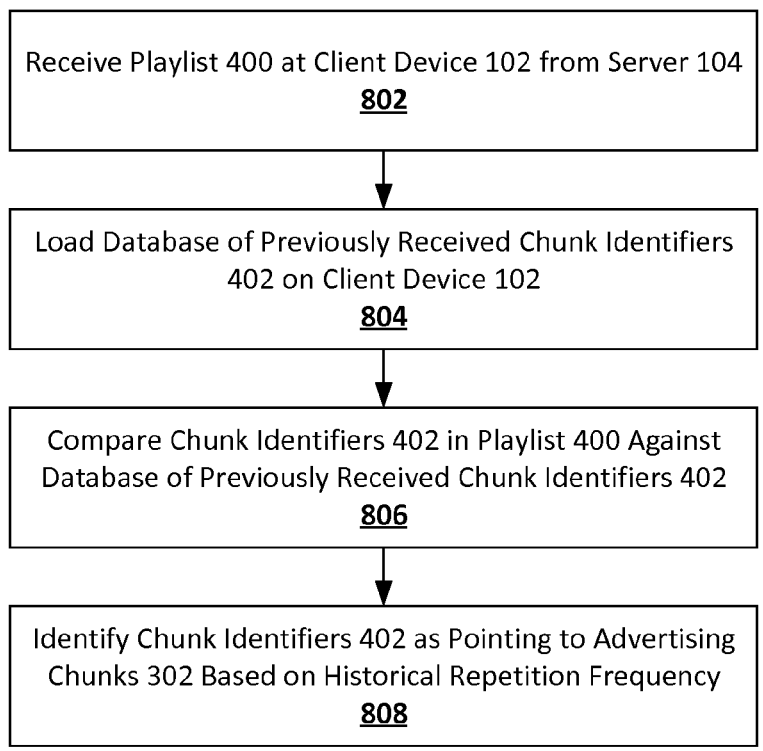
FIG. 8 depicts a fourth method for detecting when a playlist includes chunk identifiers likely associated with advertising chunks.

FIG. 8 depicts a fourth method for detecting when a playlist 400 includes chunk identifiers 402 likely associated with advertising chunks 302. In general, advertising and promotional content repeats more frequently than non-promotional media content. By way of a non-limiting example, advertisers often insert the same advertisement into many different programs throughout the day. As such, in this method the statistical frequency of repeated chunk identifiers 402 can indicate that those chunk identifiers 402 point to advertising chunks 302 rather than content chunks 202.

At step 802, the client device 100 can receive a playlist 400 from a server 104. At step 804, the client device 100 can load a database of previously received chunk identifiers 402 from memory. The database can be a record of chunk identifiers 402 listed in various playlists 400 it has received over a period of time, such as the last half-day, day, week, month, or year. In some embodiments the database can store chunk identifiers 402 received more than once, or more than a preset threshold, over a preset period of time, while chunk identifiers 402 that occur less frequently can be purged from the database immediately or periodically.

At step 806, the client device 100 can compare the chunk identifiers 402 in the playlist 400 against the chunk identifiers 402 in its database to determine if any have historically occurred in a frequently repeating pattern. In some embodiments, a frequency threshold can be set to indicate how often a chunk identifier 402 can repeat before being treated as pointing to advertising chunks 302. At step 808, those chunk identifiers 402 in the playlist 400 that have historically occurred in a frequently repeating pattern can be treated as pointing to advertising chunks 302.

Figure 9:
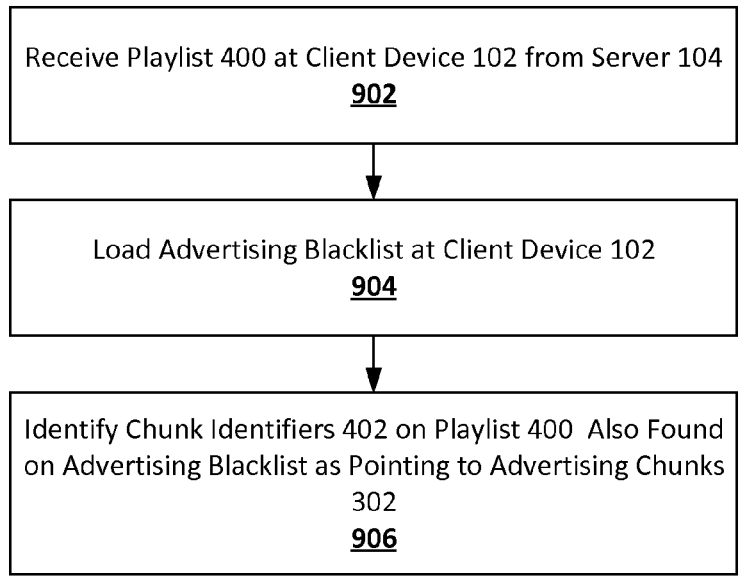
FIG. 9 depicts a fifth method for detecting when a playlist includes chunk identifiers likely associated with advertising chunks.

FIG. 9 depicts a fifth method for detecting when a playlist 400 includes chunk identifiers 402 likely associated with advertising chunks 302. At step 902, the client device 100 can receive a playlist 400 from a server 104. At step 904, the client device 100 can load an advertising blacklist from memory. The advertising blacklist can be a database, list, or other record of chunk identifiers 402 previously determined to point to advertising chunks 302.

In some embodiments the advertising blacklist can be a crowdsourced list generated from a network of client devices 100 and/or users. In these embodiments, multiple sources can contribute chunk identifiers 402 found to point to advertising chunks 302, and client devices 100 can periodically download updated copies of the advertising blacklist over the internet or other network. In other embodiments a single client device 100 can maintain its own advertising blacklist, adding chunk identifiers 402 found through any of the methods described herein to point to advertising chunks 302.

In some embodiments a user of the client device 100 can flag content as being advertising, promotional, or media content while watching a media stream 102, and the chunk identifier 402 pointing to the advertising chunk 302 being displayed on screen at the time of the user's flagging can be added to a crowdsourced or client-device-specific advertising blacklist.

At step 906, those chunk identifiers 402 in the playlist 400 found on the advertising blacklist can be identified as pointing to advertising chunks 302.

In alternate embodiments the advertising blacklist can identify known providers of advertising or promotional content. In these embodiments, the client device 100 can use the server name and/or URL of chunk identifiers 402 on the playlist 400 to look up server registration records to determine the owner of a listed server 104. The server owner's name can be reviewed against the advertising blacklist to determine if chunks hosted on that server are likely advertising chunks 302.

Figure 10:
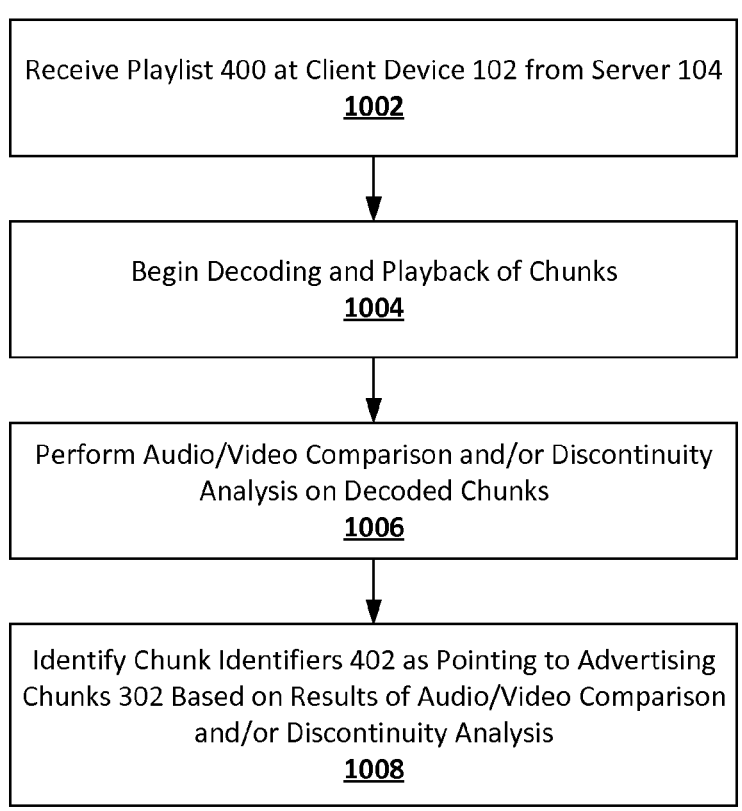
FIG. 10 depicts a sixth method for detecting when a playlist includes chunk identifiers likely associated with advertising chunks.

FIG. 10 depicts a sixth method for detecting when a playlist 400 includes chunk identifiers 402 likely associated with advertising chunks 302. At step 1002, the client device 100 can receive a playlist 400 from a server 104. At step 1004, the client device 100 can begin to receive and decode chunks pointed to by the chunk identifiers 402 in the playlist 400.

At step 1006, the client device 100 can perform audio and/or video comparison of at least a portion of decoded chunks against a database of known advertising chunks 302. By way of a non-limiting example, samples of decoded audio from a decoded chunk can be compared against an audio database comprising audio samples of known advertising or promotional content. By way of a non-limiting example, one or more selected video frames can be extracted from each chunk and compared against representative frames in a database of known advertising or promotional content. In some embodiments, this comparison can occur during buffering prior to display of decoded chunks to a user.

In some embodiments, decoded chunks can be alternately and/or additionally analyzed to detect audio and/or video discontinuities that can indicate a transition from media content to advertising content or vice versa, such as a change or difference between one or more audio and/or video encoding attributes of one chunk relative to prior or subsequent chunks in the playlist 400. In some embodiments, such discontinuities between chunks can be indicated by relative differences in the chunks' frame size, aspect ratio, audio level, number of secondary audio and/or video streams, language of secondary audio and/or video streams, start or stop positions of closed-captioning text, format of closed-captioning text, time stamps, and/or other audio or video encoding attributes. By way of a non-limiting example, each chunk can be encoded with a parameter that indicates a relative audio level, such as a "dialnorm" parameter that indicates the chunk's playback gain. Because content chunks 202 from the same piece of media content can be encoded with a common dialnorm parameter, and advertising chunks 302 can be encoded separately with a dialnorm parameter that often makes advertisements louder than main media content, a change in the dialnorm parameter relative to other chunks can indicate a transition between media content to advertising content or vice versa.

At step 1008, any chunks found to match known advertising or promotional content, and/or that follow or precede detected content discontinuities can be treated as advertising chunks 302.

Figures 11, 12:
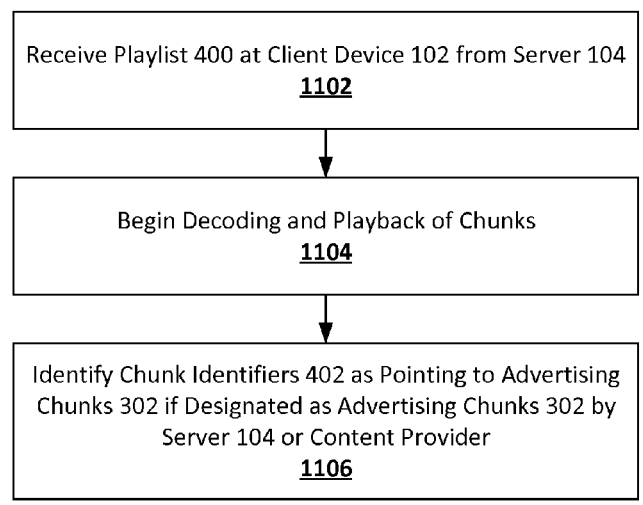
FIG. 11 depicts a seventh method for detecting when a playlist includes chunk identifiers likely associated with advertising chunks.
FIG. 12 depicts an example of a no-trick-play flag that can be set in memory at a client device.

FIG. 11 depicts a seventh method for detecting when a playlist 400 includes chunk identifiers 402 likely associated with advertising chunks 302. At step 1102, the client device 100 can receive a playlist 400 from a server 104. At step 1104, the client device 100 can begin to receive and decode chunks pointed to by the chunk identifiers 402 in the playlist 400. In some embodiments the server 104 and/or content provider can indicate in the playlist 400 and/or through the encoding of each chunk that chunks are associated with advertising or promotional content. By way of a non-limiting example, in some embodiments a chunk identifier 402 in the playlist 400 can include an advertising tag, or include a sequence of characters in its filename that indicates it points to an advertising chunk 302. By way of another non-limiting example, in some embodiments an advertising chunk 302 can be encoded with a tag in a header or metadata indicating it is an advertising chunk 302 instead of a content chunk 202. At step 1106, the client device 100 can treat chunks designated as an advertising chunk 302 by the server 104 or a content provider as an advertising chunk 302.

In some embodiments, any single method described above can be used by a client device 100 to detect chunk identifiers 402 likely to point to advertising chunks 302. In alternate embodiments, more than one of the methods described above can be used by a client device 100 to improve its confidence level in a determination that a chunk identifier 402 likely points to an advertising chunk 302. By way of a non-limiting example, an initial series of chunk identifiers 402 in a playlist 400 can be reviewed against an advertising blacklist according to the method of FIG. 9 to determine whether they likely point to content chunks 202 or advertising chunks 302, and after that determination the client device 100 can switch between treating subsequent chunk identifiers 402 as pointing to content chunks 202 and advertising chunks 302 every time a discontinuity tag 404 is encountered in the playlist 400 after the initial series of chunk identifiers 402 according to the method of FIG. 5.

While a client device 100 is described as detecting inserted advertising chunks 302 in the methods described above, in alternate embodiments an intermedia network element between the server 104 and the client device 100 can perform any of the detection methods described above and can communicate its findings with the client device 100. By way of a non-limiting example, an intermediate network element can intercept playlists 400 and detect inserted advertising chunks 302 through any of the above methods. The intermedia network element can then either inform the client device 100 which chunk identifiers 402 likely point to advertising chunks 302, or provide the client device 100 with a modified version of the playlist 400 that identifies and/or removes chunk identifiers 402 that likely point to advertising chunks 302.

After one or more chunk identifiers 402 that point to advertising chunks 302 have been identified in a playlist 400 using one or more of the methods described above, or any other method, the client device 100 can use that information to either prevent a user from skipping past identified advertising chunks 302 during playback, or to enable skipping over the identified advertising chunks 302.

As mentioned above, in some embodiments when advertising chunks 302 have been found to be inserted into a media stream 102, the client device 100 can block trick-play commands that would otherwise skip over or through the advertising chunks 302. Client devices 100 are often configured to allow users to request fast-forwarding, rewinding, seeking, or other trick-play commands to navigate through media content. By way of a non-limiting example, users can press a fast-forward button or select a fast-forward option to request that their client device 100 fast-forward through the media content faster than real-time playback. By way of other non-limiting examples, users can press a skip button to jump ahead in the media content by a selected or preset amount of time, or select a location within a timeline representing the media content to jump non-linearly to a desired position in the media content. However, the client device 100 can be configured to disallow such trick-plays through identified advertising chunks 302, but still allow trick-play commands to be carried out through some or all content chunks 202. As such, viewers can be given the option to fast-forward, rewind, or seek through main media content, but be prevented from skipping over or through inserted advertising or promotional content.

FIG. 12 depicts a non-limiting example of a no-trick-play flag 1200 that can be set in memory at a client device 100. The no-trick-play flag 1200 can be a binary flag set by client device 100 to true or false to indicate whether or not the client device 100 should carry out received trick-play commands. In some embodiments, the client device 100 can be set to turn on the no-trick-play flag 1200 during playback of a media stream 102 at a predetermined period of time prior to the start of playback of one or more advertising chunks 302 inserted into the media stream 102. By way of a non-limiting example, as shown in FIG. 12 the client device 100 can be set to turn on the no-trick-play flag 1200 a few seconds prior to the beginning of a series of identified advertising chunks 302, during playback of a preceding content chunk 202, so that the no-trick-play flag 1200 can be set before a viewer is likely to anticipate the beginning of an advertising break. In other embodiments, the client device 100 can be set to turn on the no-trick-play flag 1200 during playback of a media stream 102 at the same time as the beginning of playback of one or more advertising chunks 302 inserted into the media stream 102. The client device 100 can be set to turn off the no-trick-play flag 1200 when playback of inserted advertising chunks 302 has completed and the client device 100 begins playing back subsequent content chunks 202, as shown in FIG. 12.

In some embodiments the client device 100 can use a single no-trick-play flag 1200 that can be turned on and off as each chunk identifier 402 in the playlist 400 is processed and/or decoded. In other embodiments the client device 100 can examine a playlist 400 and set individual no-trick-play flags 1200 for each chunk pointed to by the playlist's chunk identifiers 402 prior to beginning playback of the chunks.

In some embodiments, client devices 100 can be configured to carry out trick-play commands or not carry out trick-play commands based on the status of the no-trick-play flag 1200. By way of a non-limiting example, client devices 100 can be set to carry out requested trick-play commands during playback of some or all content chunks 202, but be set to not carry out requested trick-play commands during playback of inserted advertising chunks 302 while the no-trick-play flag 1200 is set, to increase the likelihood of users viewing the inserted advertising or promotional content.

In some embodiments, client devices 100 can carry out received trick-play commands using skip and/or set position methods. A skip method can jump forward or back by a desired period of time to chunks at other locations within a media stream 102 relative to a chunk currently being played, while a set position method can jump to a chunk located at a specified absolute location in the media stream 102. When a no-trick-play flag 1200 has been set, either or both of those methods can be disallowed, or a client device 100 can perform an alternate version of the method.

Figure 13:
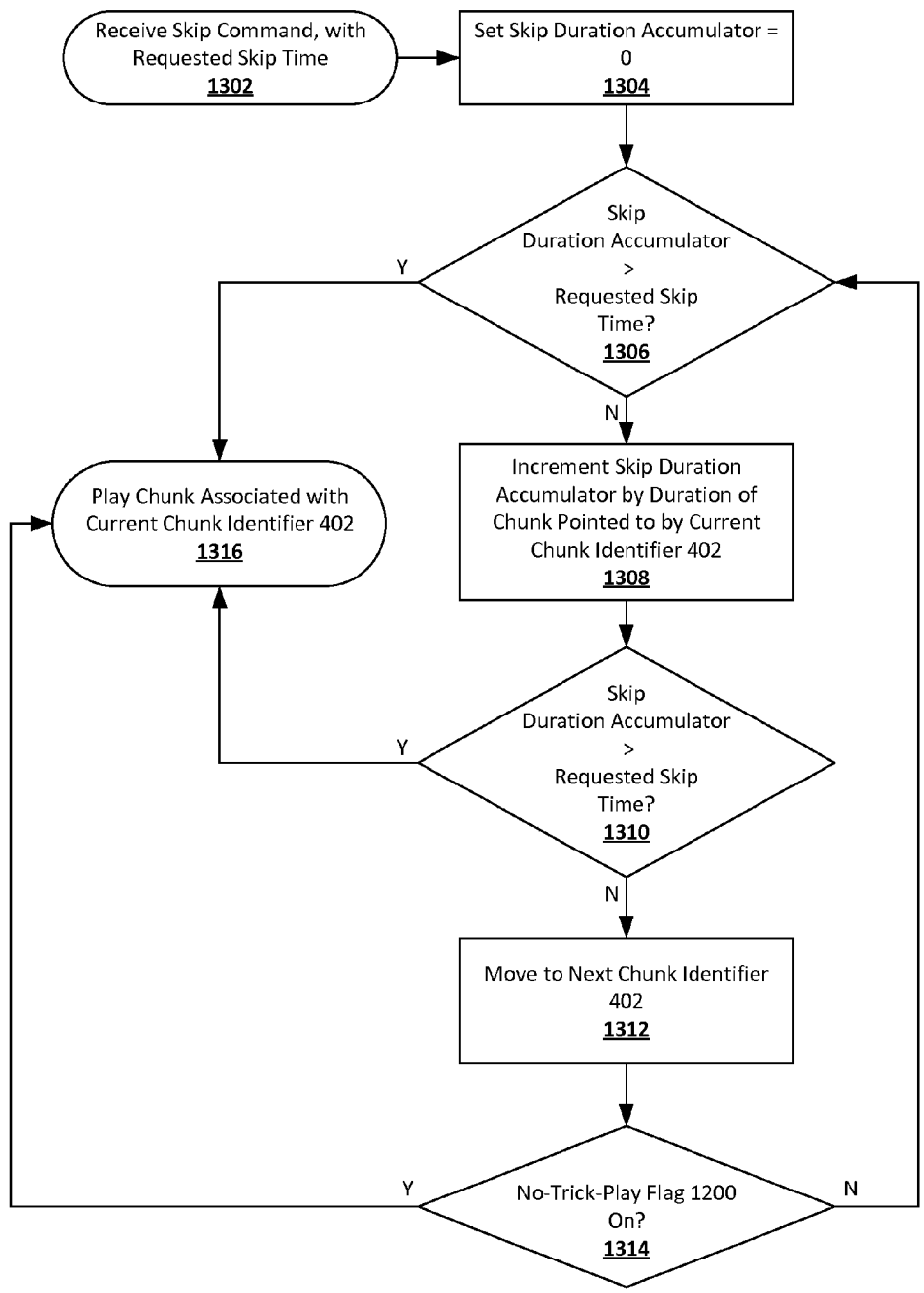
FIG. 13 depicts an example of a skip method that allows skipping through chunks when a no-trick-play flag is off, but disallows further skipping of chunks when a no-trick-play flag that is turned on is encountered.

FIG. 13 depicts a non-limiting example of a skip method that allows skipping through chunks when a no-trick-play flag 1200 is off, but disallows further skipping of chunks when a no-trick-play flag 1200 that is turned on is encountered.

At step 1302, the client device 100 can receive a skip trick-play command from a user while the client device 100 is playing back a chunk associated with a chunk identifier 402 in a playlist 400. The skip trick play command can be associated with a requested skip time. In some embodiments the requested skip time can be preset. By way of a non-limiting example, the client device can be set to interpret one press of a fast-forward button as a request for a 10 second skip. In other embodiments the requested skip time can be entered or selected by a user.

At step 1304, the client device 100 can initialize a skip duration accumulator in memory. By way of a non-limiting example, the skip duration accumulator can be initially set to 0.

At step 1306, the client device 100 can compare the current value of the skip duration accumulator to the requested skip time. If the skip duration accumulator is greater than the requested skip time, the client device can move to step 1316 and play, or continue to play, a chunk pointed to by the current chunk identifier 402. However, if the skip duration accumulator is less than or equal to the requested skip time, the client device 100 can move to step 1308.

At step 1308, the client device 100 can increment the skip duration accumulator by the duration of the chunk pointed to by the current chunk identifier 402. By way of a non-limiting example, if the current chunk identifier 402 in the playlist 402 has an #EXTINF tag indicating that the chunk it points to has a duration of 10 seconds, the skip duration accumulator can be incremented by 10.

At step 1310, the client device 100 can again compare the current value of the skip duration accumulator to the requested skip time. If the skip duration accumulator, after being incremented during step 1308, is greater than the requested skip time, the client device can move to step 1316 and play, or continue to play, a chunk pointed to by the current chunk identifier 402. However, if the skip duration accumulator is still less than or equal to the requested skip time, the client device 100 can move to step 1312 and move on to the next chunk identifier 402 in the playlist 400, which will become the current chunk identifier 402 for the next iteration starting at step 1306. If the skip request was a fast-forward request the next chunk identifier 402 can be chosen as a chunk identifier 402 that occurs later in the playlist 400, while if the skip request was a rewind request the next chunk identifier 402 can be chosen as a chunk identifier 402 that occurs earlier in the playlist 400. After step 1312, the client device 100 can move to step 1314.

At step 1314, the client device 100 can determine whether the no-trick-play flag 1200 is set in memory for the chunk pointed to by the current chunk identifier 402. As discussed above, the no-trick-play flag 1200 can be set by the client device at or before an identified advertising chunk 302 inserted into a playlist 400. If the no-trick-play flag 1200 has not been set, the client device 100 can return to the steps beginning at step 1306 to either play the chunk pointed to by the next chunk identifier 402 or again increment the skip duration accumulator and/or move to a chunk identifier 402 farther down the playlist 400.

However, if client device 100 finds during step 1314 that the no-trick-play flag 1200 has been set, it can move directly to step 1316 and play the chunk pointed to by the next chunk identifier 402, even if the client device 100 hasn't yet moved down the playlist 400 by the full requested skip time.

By way of a non-limiting example, a user can input a skip command with a 60 second requested skip time. If each chunk has a duration of 10 seconds, the client device 100 can loop through steps 1306 through 1314 six times until the skip duration accumulator reaches a value greater than 60 seconds, thereby moving the client device 100 from the chunk identifier 402 being processed when the skip command was received to a different chunk identifier 402 six places down the playlist 400, as long as those six chunk identifiers 402 were not identified as pointing to advertising chunks 302 and the no-trick-play flag 1200 was not set for any of them. However, if the chunk identifier 402 five places down the playlist 400 from the initial chunk identifier 402 did point to an advertising chunk 302 and the no-trick-play flag 1200 was set for it, the client device 100 can loop through steps 1306 through 1314 until the no-trick-play flag 1200 is encountered. Instead of returning to step 1306, the client device 100 can begin playing the first advertising chunk 302 even if it occurs less than 60 seconds away from the chunk that was playing when the 60-second skip command was received.

Figure 14:
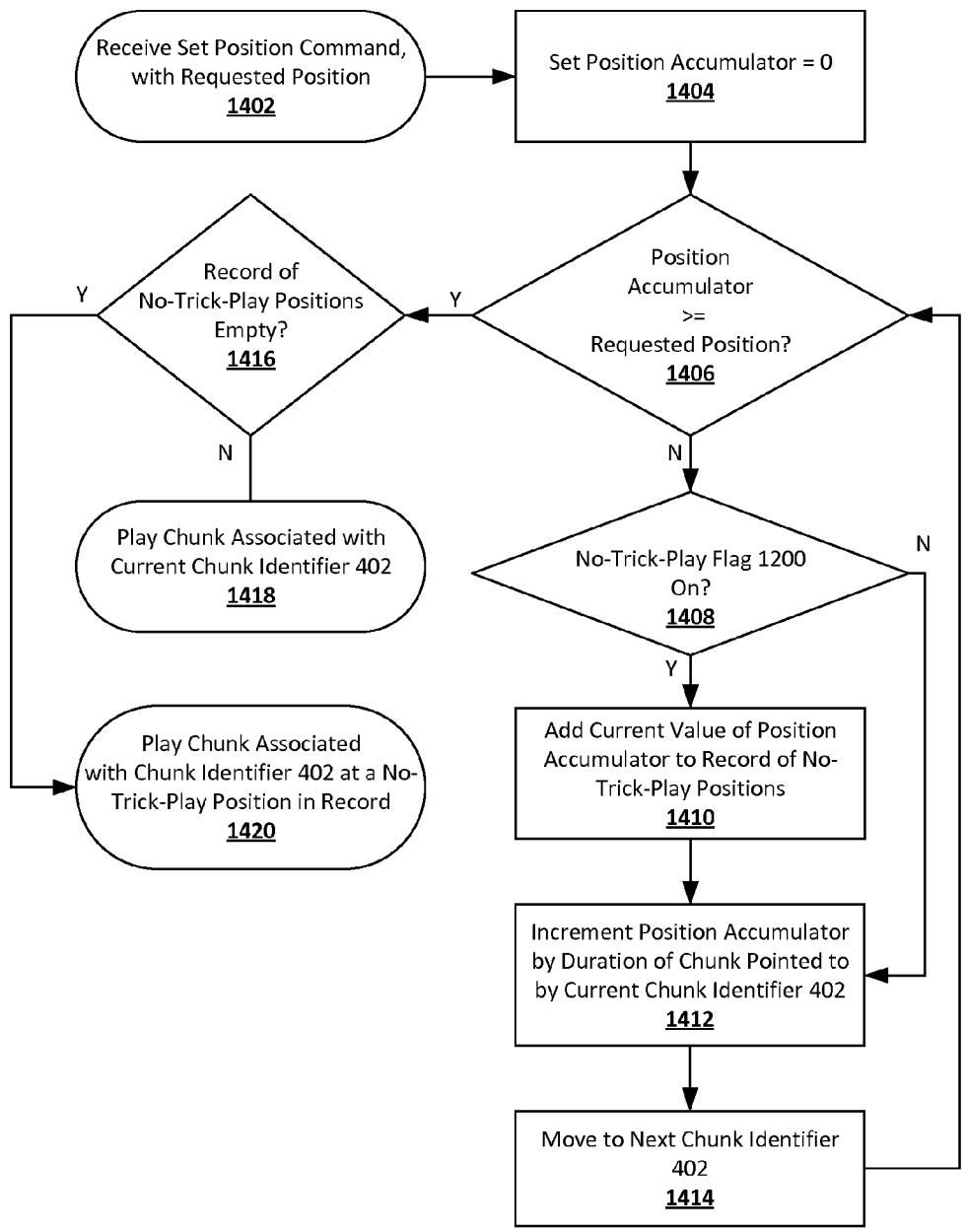
FIG. 14 depicts an example of a set position method that allows jumping to a chunk at a requested position in a media stream when a no-trick-play flag is off, but begins playback at an identified advertising chunk instead of the chunk at the requested position when a no-trick-play flag is encountered.

FIG. 14 depicts a non-limiting example of a set position method that allows jumping to a chunk at a requested position in a media stream 102 when a no-trick-play flag 1200 is off, but begins playback at an identified advertising chunk 302 instead of the chunk at the requested position when a no-trick-play flag 1200 is encountered.

At step 1402, the client device 100 can receive a set position trick-play command from a user. The set position trick-play command can be associated with a requested position within the media stream 102. By way of a non-limiting example, a set position command can indicate that the user desires to jump directly to a position 10 minutes into a 22 minute video.

At step 1404, the client device 100 can initialize a position accumulator in memory. By way of a non-limiting example, the position accumulator can be initially set to 0.

At step 1406, the client device 100 can compare the current value of the position accumulator to the requested position. If the position accumulator is equal to or greater than the requested position, the client device can move to step 1416, discussed below. However, if the position accumulator is less than the requested position, the client device 100 can move to step 1408.

At step 1408, the client device 100 can determine whether the no-trick-play flag 1200 is set in memory for the chunk pointed to by the current chunk identifier 402. If the no-trick-play flag 1200 is found to be set in step 1408, the client device 100 can move to step 1410 and record the current value of the position accumulator in a database, list, or other record of no-trick-play positions, and then move to step 1412. If the no-trick-play flag 1200 is not found to be set in step 1408, the client device 100 can move directly to step 1412.

At step 1412, the client device 100 can increment the position accumulator by the duration of the chunk pointed to by the current chunk identifier 402. By way of a non-limiting example, if the current chunk identifier 402 in the playlist 402 has an #EXTINF tag indicating that the chunk it points to has a duration of 10 seconds, the position accumulator can be incremented by 10.

At step 1414, the client device 100 can move on to the next chunk identifier 402 in the playlist 400, which will become the current chunk identifier 402 for the next iteration starting at step 1406. The client device 100 can then return to step 1406.

At step 1416, after the client device 100 determines during step 1406 that the position accumulator has been incremented to be greater than or equal to the requested position, the client device 100 can determine whether any entries were added to the record of no-trick-play positions during step 1410. If the record of no-trick-play positions is empty, the client device 100 can move to step 1418 and begin playing the chunk pointed to by the current chunk identifier 402, which is at the requested position.

Figure 15A:
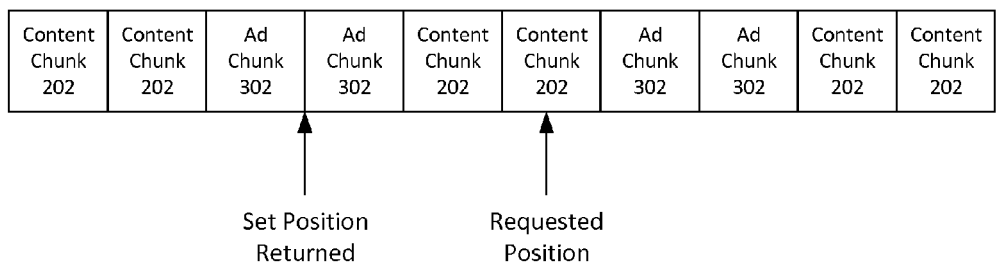
FIG. 15A depicts an example of a client device playing a chunk at a no-trick-play position most recently added to a record of no-trick-play positions.
Figure 15B:
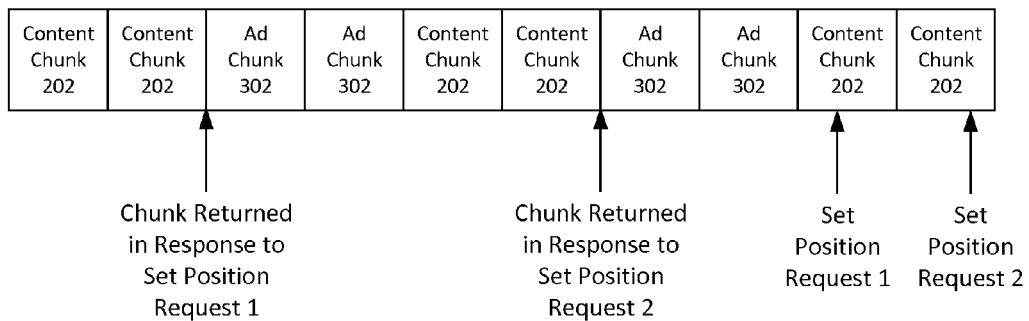
FIG. 15B depicts an example of a client device playing a chunk at a different series of advertising chunks each time a set position request is received.

However, if the record of no-trick-play positions is not found to be empty during step 1416, the client device 100 can move to step 1420 and play a chunk associated with the chunk identifier 402 at one of the no-trick-play positions found in the record, instead of the chunk at the requested position. In some embodiments, the client device 100 can begin playing a chunk at the no-trick-play position most recently added to the record of no-trick-play positions, such that the client device 100 begins playback at the latest advertising chunk 302 prior to the requested position, as shown in FIG. 15A. In other embodiments, the client device 100 can iterate through no-trick-play positions in the record as multiple set position requests are received, as shown in FIG. 15B. By way of a non-limiting example, upon a first set position request with a requested position occurring past one or more advertising chunks 302, the client device 100 can begin playback at the first advertising chunk 302 in a first series of advertising chunks 302. If an additional set position request is received with a requested position occurring past one or more subsequent advertising chunks 302, the client device 100 can begin playback at the first advertising chunk 302 of a second series of advertising chunks 302. As each subsequent set position request can lead a viewer to a subsequent series of advertising chunks 302, the viewer can be presented with all the advertising chunks 302 inserted into the media stream 102.

In alternate embodiments, the server 104 can additionally and/or alternately control prevention of skipping through or over advertising chunks 302 inserted into a media stream 102. In these embodiments, the server 104 can use a pacing mechanism such that advertising content is not served faster than real-time when the client device 100 has retrieved an advertising chunk 302 and is likely to still be decoding and/or playing back that advertising chunk 302. As such, the server 104 can limit providing the client device 100 with chunks more quickly than the chunks can be consumed in real time when advertising or promotional content is currently being viewed at the client device 100. By way of a non-limiting example, the server 104 can pace its output of chunks to the client device 100 by writing fixed sized data blocks, such as 64 kB data blocks, into the socket at fixed intervals. By way of another non-limiting example, the server 104 can pace its output of chunks to the client device 100 by placing an upper bound on the congestion window (cwnd) based on the rate of streaming and round-trip time. However, when content chunks 202 are being viewed, the server 104 can provide content chunk 202 to the client device 100 at any desired rate to allow the client device 100 to implement trick plays and traverse through the media stream 102 until an advertising chunk 302 is encountered, at which point throttling can begin.

In some embodiments, the methods described above can be used to prevent skipping over or through all identified advertising chunks 302. In other embodiments, attributes of each advertising chunk 302 can be taken into account by the client device 100, and the client device 100 can allow trick-plays through or over some advertising chunks 302 but not others. By way of a non-limiting example, an advertising chunk 302 can have a tag or metadata that indicates it creation date or an expiration date. In this example, a client device 100 can be configured to allow skipping over or through advertising chunks 302 that have expired or are older than a preset threshold, while disallow skipping over or through newer or non-expired advertising chunks 302. By way of another non-limiting example, the client device 100 can track the identities of advertising chunks 302 that have already been played back at the client device 100 within a specified period of time, and can allow trick-plays over or through repeated advertising chunks 302 that have already been played within that period of time while disallowing trick-plays through other advertising chunks 302 that have not already been played within the period of time.

As mentioned above, in alternate embodiments when advertising chunks 302 have been identified as being inserted into a media stream 102, the client device 100 can be set to skip identified advertising chunks 302.

Figure 16:
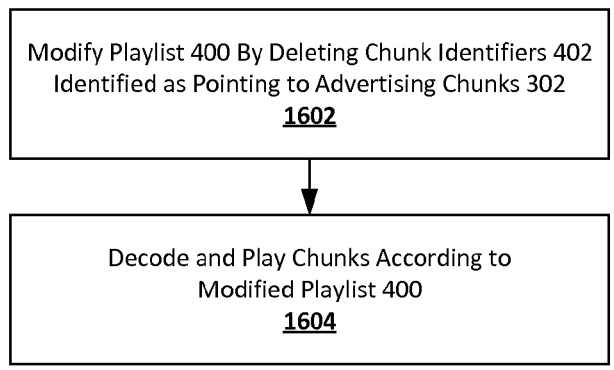
FIG. 16 depicts a first method for a client device to skip advertising chunk inserted into a media stream.

FIG. 16 depicts a first method for a client device 100 to skip advertising chunk 302 inserted into a media stream 102. At step 1602, the client device 100 can modify a playlist 400 determined to contain one or more chunk identifiers 402 that point to advertising chunks 302, by deleting the chunk identifiers 402 identified as pointing to advertising chunks 302. In some embodiments in which the chunk identifiers 402 identified as pointing to advertising chunks 302 were sandwiched between discontinuity tags 404, the discontinuity tags surrounding those chunk identifiers 402 can also be deleted. The client device 100 can save a copy of the modified playlist 400 in memory. In alternate embodiments, modification of the playlist 400 can be performed by an intermediate network element, which can then provide the modified playlist 400 to the client device 100. By way of a non-limiting example, an intermediate network element that initially identified inserted advertising chunks 302 can use that information to modify the playlist 400 and then provide the modified playlist 400 to the client device 100.

At step 1604, the client device 100 can begin decoding and playback of the chunks pointed to by the chunk identifiers 402 remaining in the modified playlist 400. In some embodiments, requested trick-play commands received by the client device 100 can be carried out with skip or set position methods that traverse the modified playlist 400, or through any other desired method using the chunk identifiers 402 in the modified playlist 400.

Figure 17:
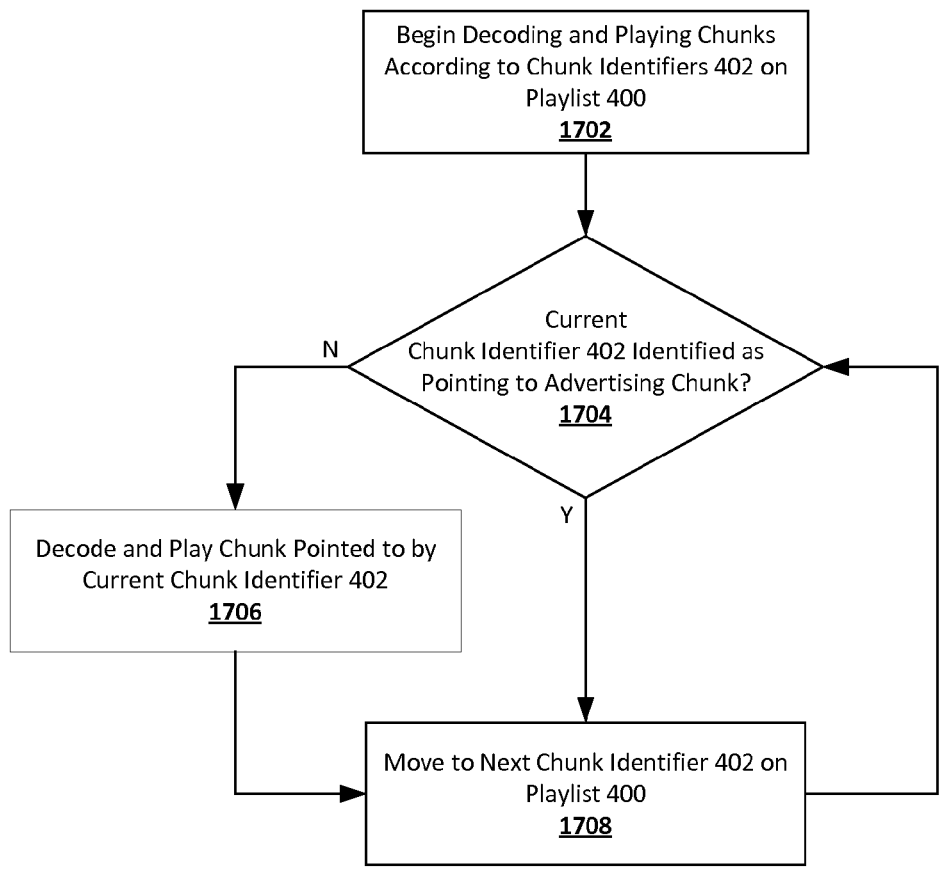
FIG. 17 depicts a second method for a client device to skip advertising chunk inserted into a media stream.

FIG. 17 depicts a second method for a client device 100 to skip advertising chunk 302 inserted into a media stream 102. At step 1702, the client device 100 can begin playing back chunks according to the playlist 400. At step 1704, the client device 100 can determine if the current chunk identifier 402 is one identified as pointing to an advertising chunk 302. If it has not been identified as pointing to an adverting chunk 302, the client device 100 can move to step 1706 to decode and play back the chunk pointed to by the current chunk identifier 402, after which it can iterate to the next chunk identifier 402 on the playlist at step 1708 and then return to step to 1704 to evaluate the next chunk identifier 402. However, if the current chunk identifier 402 is found during step 1704 to have been identified as pointing to an advertising chunk 302, the client device 100 can move directly to step 1708 to move to the next chunk identifier 402 without playing the chunk pointed to by the current chunk identifier 402.

In alternate embodiments and/or situations, chunks of alternate media content can be inserted into a media stream 102 in a manner similar to inserting advertising chunks 302. By way of a non-limiting example, a sports television channel implementing a blackout on a broadcast of a sporting event for certain viewers can provide those viewers with an alternate version of a playlist 400 that replaces chunk identifiers 402 pointing to content chunks 202 of the blacked-out broadcast with alternate chunk identifiers 402 pointing to content chunks 202 of an alternate program. In these embodiments, the client device 100 or an intermediate network element can perform a pattern analysis on chunk identifiers 402 in the playlist 400, find a point at which the playlist 400 shifted to chunk identifiers 402 pointing to alternate content, and then predict and recreate chunk identifiers 402 that likely point to chunks of the blacked-out original content.

Figure 18:
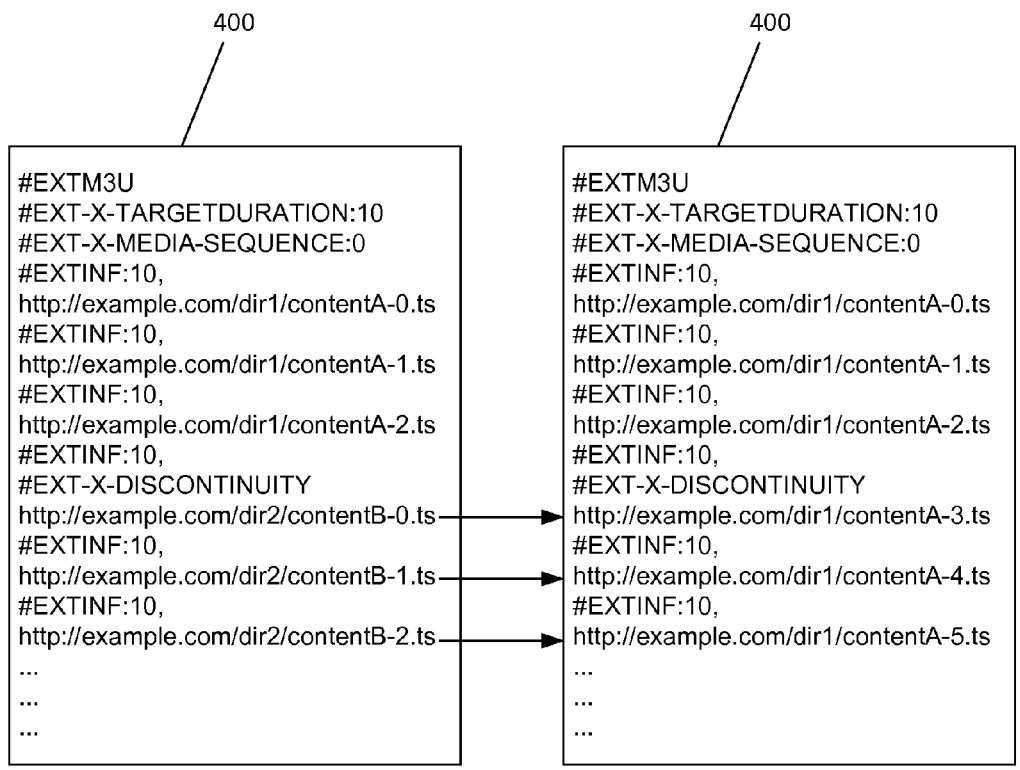
FIG. 18 depicts an example of modification of a playlist based on predicted chunk identifiers.

By way of a non-limiting example, a playlist 400 can list a series of chunk identifiers 402 having similar file names that differ only by an incrementing set of ending characters, as shown in the left playlist 400 of FIG. 18. When a shift to chunk identifiers 402 pointing to chunks of alternate content is detected using one or more other methods described above for detecting advertising chunk 302, the client device 100 or intermediate network element can follow the pattern of incrementing set of ending characters to predict chunk identifiers 402 for the blacked-out main content, as shown in the right playlist 400 in FIG. 18.

When chunk identifiers 402 for the blacked-out main content have been predicted and generated, the client device 100 can either use them to play back the blacked-out content, or to prevent playback of the blacked-out content. By way of a non-limiting example, in some embodiment the client device 100 can be configured to attempt to retrieve, decode, and play back chunks of the blacked-out content via the predicted chunk identifiers 402. In other embodiments, the client device 100 can add the predicted chunk identifiers 402 to a blacklist and/or refuse to carry out a user's request to retrieve chunks pointed to by the predicted chunk identifiers 402.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

The invention claimed is:

1. A method of preventing skipping advertisements in an adaptive bitrate stream, comprising:
receiving an adaptive bitrate stream playlist at a client device from a server, said adaptive bitrate stream playlist listing chunk identifiers pointing to a plurality of media chunks;
analyzing said adaptive bitrate stream playlist with said client device to find one or more advertising chunks within said plurality of media chunks;
retrieving and playing back at least one of said plurality of media chunks with said client device according to said adaptive bitrate stream playlist;
setting a no-trick-play flag at said client device during playback of said one or more advertising chunks;
allowing trick-plays through and over media chunks when said no-trick-play flag is not set; and
disallowing trick-plays through and over at least one media chunk when said no-trick-play flag is set, wherein disallowing trick-plays through and over at least one media chunk when said no-trick-play flag is set comprises:
receiving a set position trick-play command with a requested position at said client device;
initializing a position accumulator at said client device;
traversing through said chunk identifiers in said adaptive bitrate stream playlist, tracking positions where said no-trick-play flag is set in a record of no-trick-play positions, and
incrementing said position accumulator by the duration of the media chunks associated with each successive chunk identifier in the said adaptive bitrate stream playlist, until said position accumulator is greater than or equal to said requested position;
playing back the chunk pointed to by the chunk identifier at said requested position when said record of no-trick-play positions is empty; and
playing back an advertising chunk when said record of no-trick-play positions is not empty.

2. The method of claim 1, wherein analyzing said adaptive bitrate stream playlist with said client device to find one or more advertising chunks within said plurality of media chunks comprises determining whether said adaptive bitrate stream playlist includes pairs of discontinuity tags, and if so identifying chunk identifiers between each pair of discontinuity tags as pointing to advertising chunks.

3. The method of claim 1, wherein analyzing said adaptive bitrate stream playlist with said client device to find one or more advertising chunks within said plurality of media chunks comprises identifying a pattern followed by at least a preset percentage of chunk identifiers, and identifying any chunk identifiers that do not follow said pattern as pointing to advertising chunks.

4. The method of claim 1, wherein analyzing said adaptive bitrate stream playlist with said client device to find one or more advertising chunks within said plurality of media chunks comprises identifying any chunk identifiers that have been repeated over a preset period of time at above a statistical frequency threshold as pointing to advertising chunks.

5. The method of claim 1, wherein analyzing said adaptive bitrate stream playlist with said client device to find one or more advertising chunks within said plurality of media chunks comprises finding discontinuities in audio and/or video encoding attributes between adjacent media chunks within said plurality of media chunks that indicate transitions to or from advertising chunks, and identifying any chunk identifiers between said transitions as pointing to advertising chunks.

6. The method of claim 1, wherein the advertising chunk played back when said record of no-trick-play positions is not empty is the advertising chunk associated with the chunk identifier at the no-trick-play position most recently added to said record of no-trick-play positions.

7. The method of claim 1, wherein the advertising chunk played back when said record of no-trick-play positions is not empty is an advertising chunk in a first series of one or more advertising chunks when said set position trick-play command is a first set position trick-play command, and is an advertising chunk in a subsequent series of one or more advertising chunks when said set position trick-play command is a subsequent set position trick-play command.

* * * * *